(12) United States Patent
Martinez Fabre et al.

(10) Patent No.: US 9,803,554 B2
(45) Date of Patent: Oct. 31, 2017

(54) FUEL IGNITER ASSEMBLY HAVING HEAT-DISSIPATING ELEMENT AND METHODS OF USING SAME

(71) Applicant: Unison Industries, LLC, Jacksonville, FL (US)

(72) Inventors: Raul Arroyo Martinez Fabre, Mexico (MX); Juan Humberto Martinez Cervantes, San Miguel de Allende (MX); Ricardo Arturo Gutierrez Espinosa, Queretaro (MX); Hicham Benkabbou, Daytona Beach, FL (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 560 days.

(21) Appl. No.: 13/964,438

(22) Filed: Aug. 12, 2013

(65) Prior Publication Data
US 2015/0040575 A1 Feb. 12, 2015

(51) Int. Cl.
*F02C 7/264* (2006.01)
*F02C 7/266* (2006.01)
*F23Q 3/00* (2006.01)
*H01T 13/00* (2006.01)
*H01T 13/16* (2006.01)
(Continued)

(52) U.S. Cl.
CPC ............. *F02C 7/264* (2013.01); *F02C 7/266* (2013.01); *F23Q 3/006* (2013.01); *F23R 3/002* (2013.01); *H01T 13/16* (2013.01); *H01T 13/52* (2013.01); *F05D 2260/20* (2013.01)

(58) Field of Classification Search
CPC .......... F02C 7/266; F23Q 3/006; F23Q 3/008; H01T 13/16; F23D 2207/00; F23R 2900/00009; F23R 2900/03045

USPC ......... 60/39.821, 39.827; 123/143 R, 145 A, 123/169 C, 41.56
See application file for complete search history.

(56) References Cited

U.S. PATENT DOCUMENTS 1,147,247 A * 7/1915 Kitchen et al. ......... H01T 13/16
313/11.5
1,996,422 A * 4/1935 Hurley .................... H01T 13/16
123/169 C
(Continued)

FOREIGN PATENT DOCUMENTS

FR 495581 A 10/1919
GB 651093 A 3/1951

OTHER PUBLICATIONS

International Invitation to Pay Additional Fees issued in connection with corresponding PCT Application No. PCT/US2014/048016 dated May 28, 2015.

*Primary Examiner* — Pascal M Bui Pho
*Assistant Examiner* — Eric Linderman
(74) *Attorney, Agent, or Firm* — GE Global Patent Operation; William S. Munnerlyn

(57) ABSTRACT

A combustor for a gas turbine engine includes a combustion chamber and a fuel igniter assembly. The combustion chamber is defined by an annular inner combustor liner and an annular outer combustor liner. The fuel igniter assembly is coupled to the combustor and extends radially outward from the outer combustor liner. The fuel igniter assembly includes an igniter housing configured to house a fuel igniter therein, and a heat-dissipating element coupled to the igniter housing. The heat-dissipating element includes a plurality of fins configured to dissipate heat from the fuel igniter assembly.

18 Claims, 4 Drawing Sheets

(51) Int. Cl.
*F23R 3/00* (2006.01)
*H01T 13/52* (2006.01)

(56) References Cited

U.S. PATENT DOCUMENTS

| | | | | |
|---|---|---|---|---|
| 2,465,092 A * | 3/1949 | Harkness | F02C 7/266 | 431/254 |
| 2,604,510 A * | 7/1952 | Berkey | F02C 7/266 | 123/169 CA |
| 2,635,423 A * | 4/1953 | Oakes | F02C 7/266 | 60/39.463 |
| 2,693,082 A * | 11/1954 | Arthur | E02F 5/104 | 123/169 R |
| 2,881,363 A * | 4/1959 | Luzansky | F23Q 3/006 | 126/25 B |
| 3,017,530 A * | 1/1962 | Pierce | H01T 13/16 | 123/169 C |
| 3,330,985 A * | 7/1967 | Johnston | F02C 7/266 | 123/169 PH |
| 3,488,544 A * | 1/1970 | Massoll | H01T 13/38 | 313/131 R |
| 3,690,096 A * | 9/1972 | Harry | F02C 7/266 | 60/39.826 |
| 3,736,748 A | 6/1973 | Walker et al. | | |
| 3,911,672 A * | 10/1975 | Irwin | F23R 3/007 | 60/753 |
| 3,990,834 A | 11/1976 | DuBell et al. | | |
| 4,412,414 A * | 11/1983 | Novick | F23R 3/12 | 60/39.23 |
| 4,768,477 A * | 9/1988 | Richardson | F01P 1/10 | 123/169 C |
| 4,954,743 A * | 9/1990 | Suzuki | H01T 13/16 | 313/11.5 |
| 4,972,812 A * | 11/1990 | Strumbos | H01T 13/16 | 123/169 C |
| RE34,152 E * | 12/1992 | Meyer | H01T 13/24 | 123/169 EL |
| 5,178,550 A * | 1/1993 | Fusselman | H01T 13/04 | 439/125 |
| 5,434,741 A * | 7/1995 | Mulkins | H01T 13/52 | 123/169 EA |
| 5,513,605 A * | 5/1996 | Weldon | H01T 13/50 | 123/143 B |
| 5,984,668 A * | 11/1999 | Hansen | F23G 7/08 | 313/139 |
| 6,442,929 B1 * | 9/2002 | Kraft | F02C 7/266 | 313/145 |
| 6,557,350 B2 | 5/2003 | Farmer et al. | | |
| 7,124,724 B2 * | 10/2006 | Fleetwood | H01B 7/0063 | 123/143 C |
| 7,216,488 B2 * | 5/2007 | Howell | F01D 25/12 | 60/39.821 |
| 7,637,094 B2 | 12/2009 | Costello et al. | | |
| 8,046,987 B2 | 11/2011 | Wilmot et al. | | |
| 8,448,444 B2 | 5/2013 | Cihlar et al. | | |
| 2004/0031257 A1 * | 2/2004 | Schmotolocha | F23Q 13/00 | 60/39.826 |
| 2006/0059885 A1 * | 3/2006 | Johnson | F02C 7/266 | 60/39.821 |
| 2008/0141651 A1 * | 6/2008 | Eason | F02C 7/266 | 60/39.821 |
| 2009/0072694 A1 * | 3/2009 | Steigleman, Jr. | H01T 21/02 | 313/118 |
| 2010/0052836 A1 * | 3/2010 | Wilmot | H01F 27/025 | 336/92 |
| 2010/0139281 A1 * | 6/2010 | Callas | F02C 7/22 | 60/737 |
| 2010/0212324 A1 | 8/2010 | Bronson et al. | | |
| 2010/0251692 A1 * | 10/2010 | Kinde, Sr. | F02K 5/026 | 60/226.1 |
| 2011/0120132 A1 | 5/2011 | Rudrapatna et al. | | |
| 2012/0133264 A1 * | 5/2012 | Morin | H01T 13/39 | 313/141 |
| 2012/0210729 A1 | 8/2012 | Cihlar et al. | | |
| 2012/0227373 A1 | 9/2012 | Bunel et al. | | |
| 2013/0157204 A1 * | 6/2013 | Hong | F23D 14/64 | 431/8 |
| 2013/0196272 A1 * | 8/2013 | Camilli | H01T 13/40 | 431/6 |
| 2013/0260323 A1 * | 10/2013 | Hong | F23N 5/00 | 431/6 |
| 2014/0366505 A1 * | 12/2014 | Prociw | F02C 7/266 | 60/39.821 |
| 2014/0366551 A1 * | 12/2014 | Prociw | F23R 3/14 | 60/776 |
| 2016/0238320 A1 * | 8/2016 | Buess | C21C 5/4606 | |
| 2016/0369701 A1 * | 12/2016 | Pireyre | F02C 7/266 | |

* cited by examiner

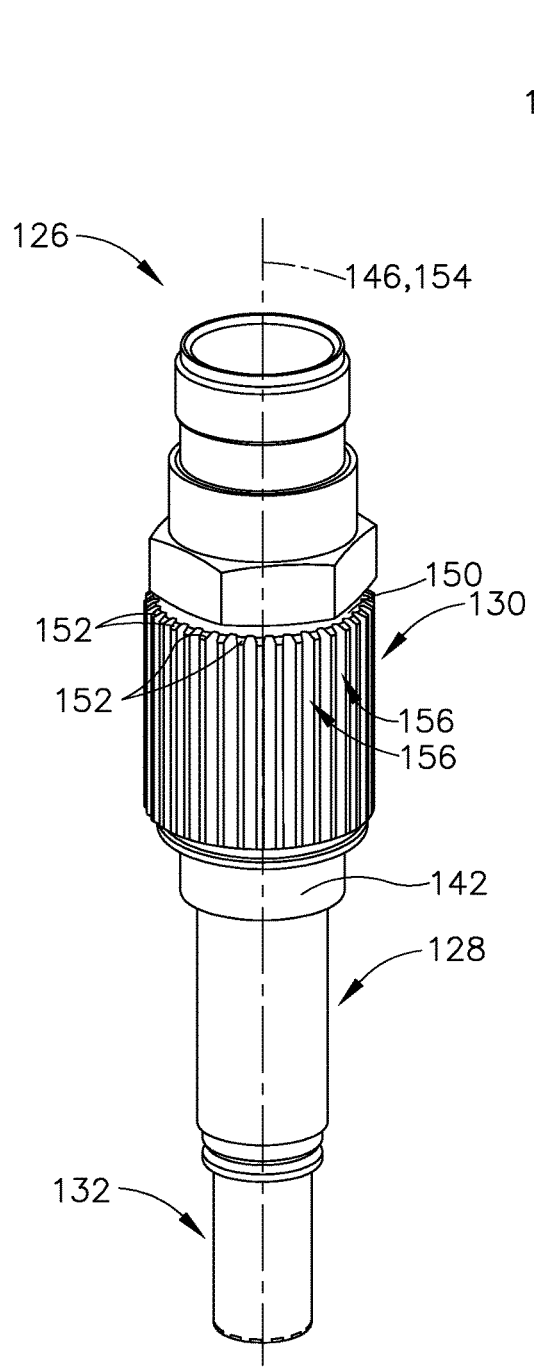
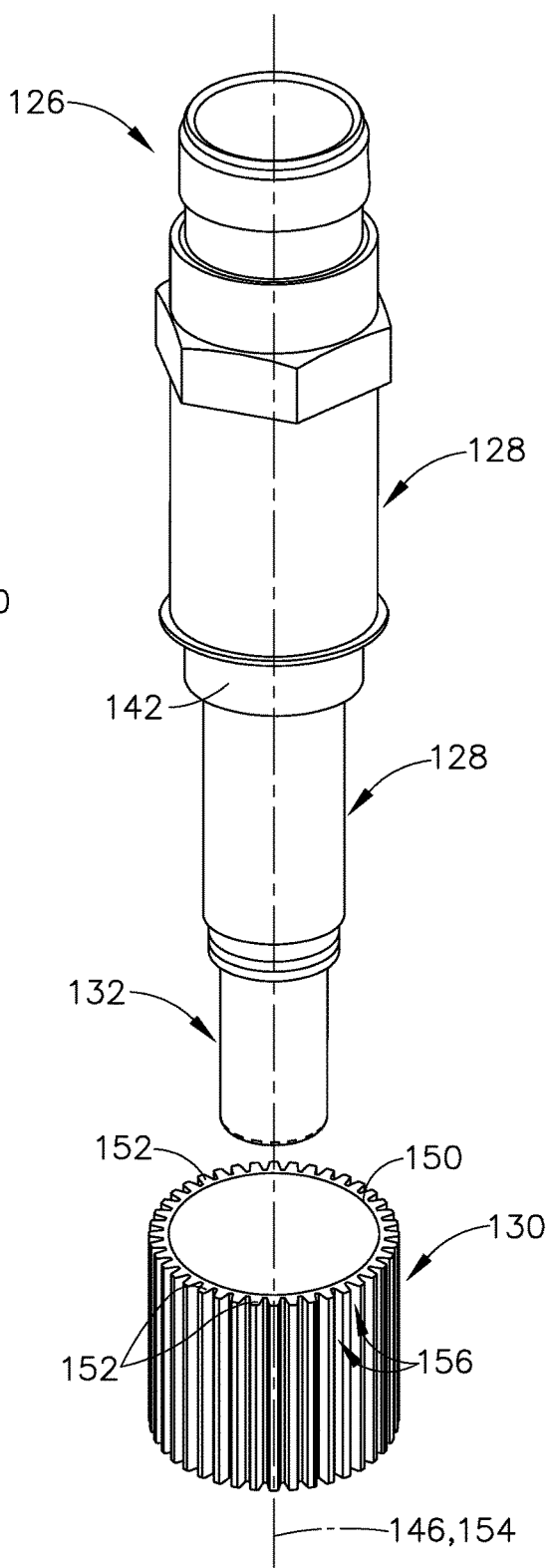
FIG. 3
FIG. 4

FUEL IGNITER ASSEMBLY HAVING HEAT-DISSIPATING ELEMENT AND METHODS OF USING SAME

BACKGROUND OF THE DISCLOSURE

The application described herein relates generally to gas turbine engine components, and more specifically to fuel igniter assemblies having heat-dissipating elements.

Gas turbine engines typically include a combustor for combusting an air-fuel mixture to produce energy and drive turbines within the gas turbine engine. A fuel igniter is typically provided to ignite the air-fuel mixture within a combustion chamber of the combustor. Heat generated by the combustion of such air-fuel mixtures is conducted through the fuel-igniter, which is typically housed within a metal casing.

As operating voltages of fuel igniters and the operating temperatures of gas turbine engines increase, components housed within the fuel igniter become more susceptible to overheating, fatigue, and decreased lifetime caused by such overheating and fatigue.

Accordingly, a need exists for a fuel igniter assembly having enhanced heat dissipation properties as compared to conventional fuel igniters.

BRIEF DESCRIPTION OF THE DISCLOSURE

In one aspect, a combustor for a gas turbine engine is provided. The combustor includes a combustion chamber and a fuel igniter assembly. The combustion chamber is defined by an annular inner combustor liner and an annular outer combustor liner. The fuel igniter assembly is coupled to the combustor and extends radially outward from the outer combustor liner. The fuel igniter assembly includes an igniter housing configured to house a fuel igniter therein, and a heat-dissipating element coupled to the igniter housing. The heat-dissipating element includes a plurality of fins configured to dissipate heat from the fuel igniter assembly.

In another aspect, a fuel igniter assembly for use in a combustor is provided. The fuel igniter assembly includes an igniter housing, a fuel igniter, an ignition lead, and a heat-dissipating element. The igniter housing includes an elongate body having a cavity defined therein. The fuel igniter is positioned within the cavity. The ignition lead is electrically coupled to the fuel igniter at a connection point within the igniter housing. The heat-dissipating element is coupled to the igniter housing such that the heat-dissipating element at least partially surrounds the connection point between the ignition lead and the fuel igniter.

In yet another aspect, a method of operating a gas turbine engine is provided. The gas turbine engine includes a combustor and a compressor. The combustor includes a fuel igniter assembly that includes an igniter housing, a fuel igniter positioned within the igniter housing, and a heat-dissipating element coupled to the igniter housing. The method includes supplying an electrical voltage to the fuel igniter and directing an airflow across the heat-dissipating element to dissipate heat from the fuel igniter assembly.

BRIEF DESCRIPTION OF THE DRAWINGS

FIG. 3 is a perspective view of the fuel igniter assembly shown in FIG. 2;

FIG. 4 is an exploded view of the fuel igniter assembly shown in FIG. 2;

Corresponding reference characters indicate corresponding parts throughout the drawings.

DETAILED DESCRIPTION OF THE DISCLOSURE

The following detailed description sets forth fuel igniter assemblies and methods of using the fuel igniter assemblies by way of example and not by way of limitation. The description should clearly enable one of ordinary skill in the art to make and use the fuel igniter assemblies, and the description sets forth several embodiments, adaptations, variations, alternatives, and uses of the fuel igniter assemblies, including what is presently believed to be the best mode thereof. The fuel igniter assemblies are described herein as being applied to a preferred embodiment, namely as a high-voltage fuel igniter assembly for a gas turbine engine or a steam turbine. However, it is contemplated that the fuel igniter assemblies and the methods of using the same may have general application in a broad range of systems other than gas turbine engines (e.g., automobiles, watercraft, spacecraft, etc.) and/or a variety of commercial, industrial, and/or consumer applications other than as a high-voltage fuel igniter assembly (e.g., a low-voltage fuel igniter assembly).

Figure 1:
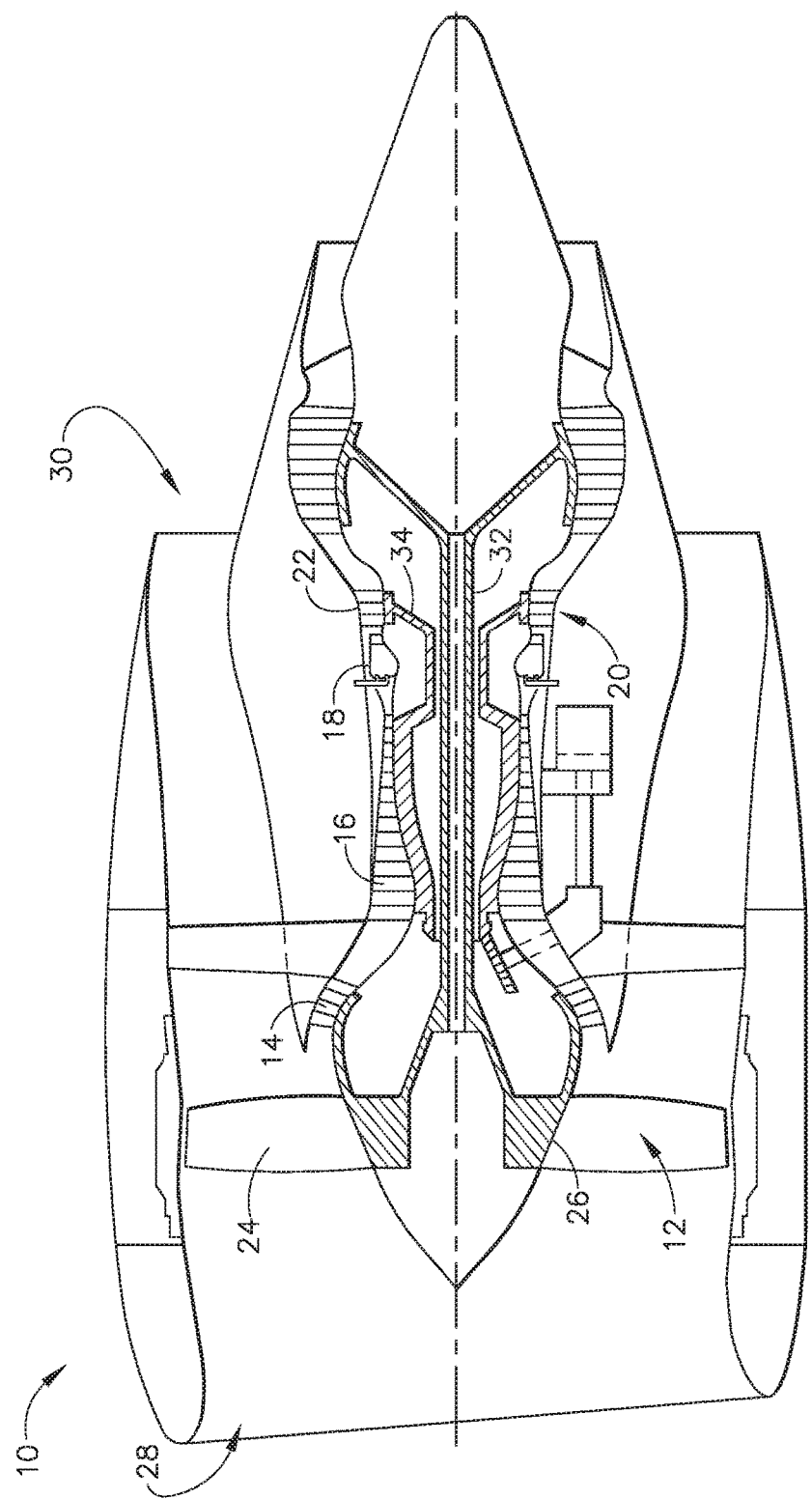
FIG. 1 is a schematic illustration of an exemplary gas turbine engine.

FIG. 1 is a schematic illustration of an exemplary gas turbine engine 10 including a fan assembly 12, a booster 14, a high pressure compressor 16, and a combustor 18. The engine 10 also includes a high pressure turbine 20, and a low pressure turbine 22, all in serial flow arrangement. The fan assembly 12 includes an array of fan blades 24 extending radially outward from a rotor disk 26. The engine 10 includes an intake side 28 and an exhaust side 30. In the exemplary embodiment, engine 10 may be, but is not limited to being, a LEAP or P20 gas turbine engine available from General Electric Company, Cincinnati, Ohio. Fan assembly 12, booster 14, and turbine 22 may be coupled by a first rotor shaft 32, and the compressor 16 and turbine 20 may be coupled by a second rotor shaft 34.

In operation, air flows through fan assembly 12 and compressed air is supplied to high pressure compressor 16 through booster 14. The highly compressed air is delivered to combustor 18, where it is mixed with a fuel and ignited to generate combustion gases. The combustion gases are channeled from the combustor 18 to drive the turbines 20 and 22. The turbine 22 drives the fan assembly 12 and booster 14 by way of shaft 32. The turbine 20 drives the compressor 16 by way of shaft 34.

Figure 2:
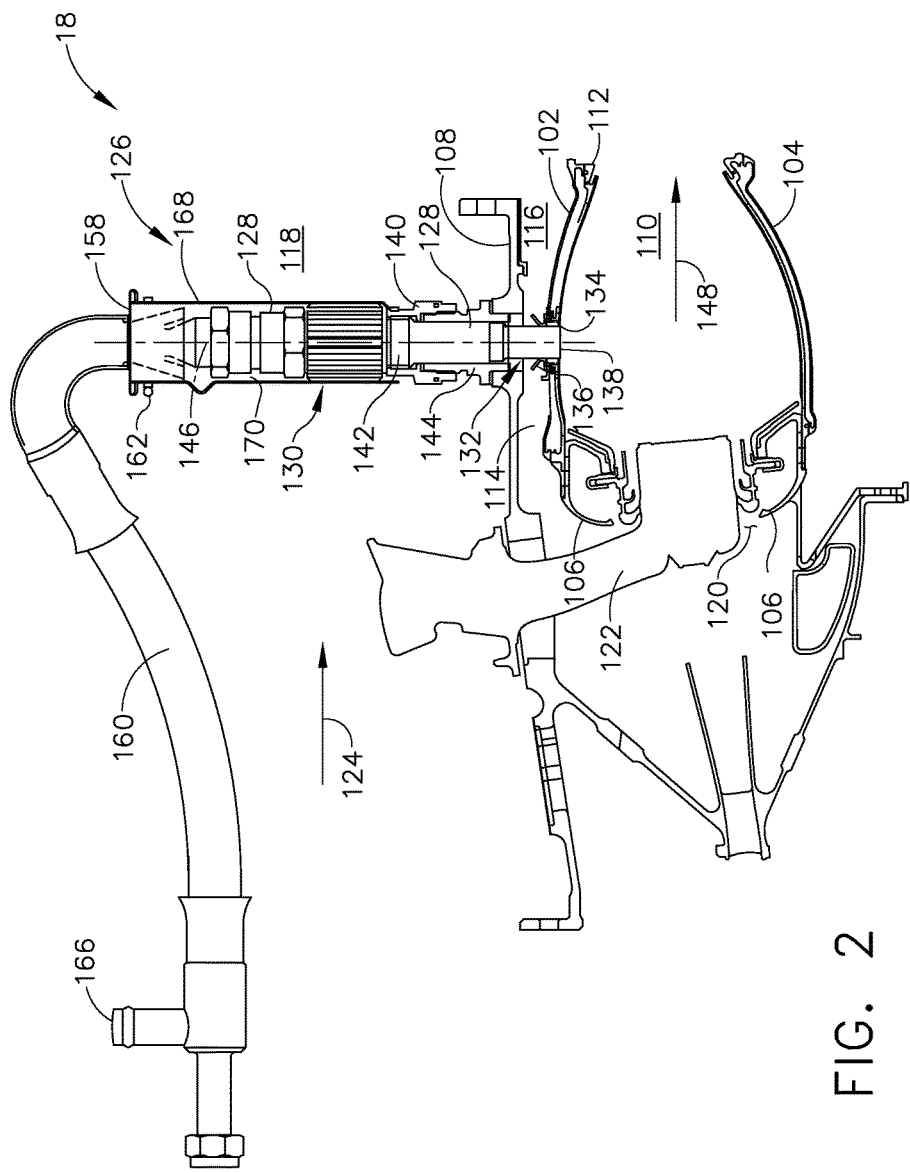
FIG. 2 is a cross-sectional view of a combustor including a fuel igniter assembly suitable for use with the gas turbine engine shown in FIG. 1.

FIG. 2 is a cross-sectional view of combustor 18 used in gas turbine engine 10. Combustor 18 includes an annular outer combustor liner 102, an annular inner combustor liner 104, and a dome plate 106 that extends between outer and inner combustor liners 102 and 104, respectively. Outer combustor liner 102 and inner combustor liner 104 are spaced radially inward from a combustor casing 108 and define a combustion chamber 110. Combustion chamber 110 is generally annular in shape and is disposed between combustor liners 102 and 104. Outer and inner combustor liners 102 and 104 extend from the dome plate 106 to a turbine nozzle 112 disposed downstream from the dome plate 106. Outer combustor liner 102 and combustor casing 108 define an outer passageway 114, and combustor casing 108 separates a combustor interior 116 from a combustor exterior 118.

Dome plate 106 includes an opening 120 through which a fuel mixer 122 extends. Fuel mixer 122 is configured to mix air from compressor 16 and fuel from a fuel source (not shown). Fuel mixer 122 is further configured to atomize the air-fuel mixture, and deliver the atomized air-fuel mixture into combustion chamber 110.

During engine operation, airflow (not shown) exits high pressure compressor 16 (shown in FIG. 1) at a relatively high velocity and is directed into combustor 18 where the airflow is mixed with fuel by fuel mixer 122, and the fuel/air mixture is ignited. As described in more detail below, a portion of the airflow, indicated by arrow 124, may be channeled from fan assembly 12 and/or compressor 16 along exterior 118 of combustor casing 108.

To ignite the air-fuel mixture within combustion chamber 110, a fuel igniter assembly 126 is provided downstream from the combustor dome plate 106 along outer combustor liner 102. Fuel igniter assembly 126 includes a cylindrical igniter housing 128 configured to house a fuel igniter (shown in FIG. 5) therein, and a heat-dissipating element 130 coupled to the igniter housing 128 to dissipate heat from fuel igniter assembly 126 generated from combustion of the air-fuel mixture within combustion chamber 110.

Fuel igniter assembly 126 is coupled to outer combustor liner 102 along a tip portion 132 of fuel igniter assembly 126, and extends radially outward from outer combustor liner 102 through outer passageway 114 and combustor casing 108. Tip portion 132 is coupled within an opening 134 extending through outer combustor liner 102, such that tip portion 132 of fuel igniter assembly 126 is concentrically aligned with respect to opening 134. In one embodiment, opening 134 has a substantially circular cross-sectional profile. A ferrule 136 is provided within opening 134 for maintaining the position of tip portion 132 with respect to combustion chamber 110 and/or outer combustor liner 102.

Tip portion 132 includes a first end 138 of fuel igniter assembly 126 which is disposed within combustion chamber 110. In the exemplary embodiment, tip portion 132 projects radially inward into combustion chamber 110, and thus, first end 138 of fuel igniter assembly 126 is positioned within combustion chamber 110 a distance radially inward from outer combustor liner 102. In alternative embodiments, tip portion 132 may be configured such that first end 138 of fuel igniter assembly 126 is substantially flush with or slightly recessed from outer combustor liner 102.

Fuel igniter assembly 126 is coupled to combustor casing 108 by a mounting element 140. In the exemplary embodiment, mounting element 140 is an adapter coupled to igniter housing 128 via a threaded engagement along a threaded portion 142 of igniter housing 128. In the exemplary embodiment, mounting element 140 is configured to mount to an engine boss 144 coupled to combustor casing 108. In alternative embodiments, mounting element 140 may be configured to be coupled directly to combustor casing 108, or mounting element 140 may be an integral component of igniter housing 128. For example, threaded portion 142 may be configured to be coupled directly to engine boss 144 or combustor casing 108.

In the exemplary embodiment, fuel igniter assembly 126 is oriented such that a longitudinal axis 146 of fuel igniter assembly 126 is substantially perpendicular to both combustor casing 108 and the axial air flow direction of turbine engine 10, indicated in FIG. 2 by arrow 148. In alternative embodiments, fuel igniter assembly 126 may be oriented at an angle other than substantially perpendicular to combustor casing 108 and/or axial air flow direction 148.

FIG. 3 is a perspective view of fuel igniter assembly 126, and FIG. 4 is an exploded view of fuel igniter assembly 126. Elements of fuel igniter assembly 126 are omitted from FIGS. 3 and 4 for illustration. As shown in FIGS. 3 and 4, heat-dissipating element 130 includes a generally cylindrical body 150 (best seen in FIG. 4) and a plurality of fins 152 configured to dissipate heat from fuel igniter assembly 126. Fins 152 extend radially outward from body 150, and extend along the longitudinal axis 154 of heat-dissipating element 130, which coincides with longitudinal axis 146 of fuel igniter assembly 126 in the exemplary embodiment. Also in the exemplary embodiment, fins 152 extend radially outward from body 150 an equal distance, although in alternative embodiments, fins 152 may extend radially outward from body 150 different distances from one another.

In the exemplary embodiment, fins 152 are oriented substantially parallel to one another such that channels 156 having a uniform width along the length of heat-dissipating element 130 are defined between fins 152. In alternative embodiments, fins 152 may be angled with respect to one another such that channels 156 have a tapered width along the length of heat-dissipating element 130, which may be utilized to increase or decrease an airflow at a desired location along fuel igniter assembly 126.

In the exemplary embodiment, heat-dissipating element 130 includes 36 fins equally spaced around the circumference of body 150. In alternative embodiments, heat-dissipating element 130 may include any suitable number of fins 152 that enables fuel igniter assembly 126 to function as described herein, such as, for example, between 20 and 40 fins 152.

In yet further alternative embodiments, fins 152 may have any other suitable size, shape, orientation, or configuration that enables heat-dissipating element 130 to function as described herein.

Referring again to FIG. 2, heat-dissipating element 130 is coupled to igniter housing 128 by a press-fit connection along a portion of igniter housing 128 disposed radially outward from combustor casing 108 and outer combustor liner 102. More specifically, heat-dissipating element 130 is coupled to igniter housing 128 between mounting element 140 and a second end 158 of fuel igniter assembly 126. In alternative embodiments, heat-dissipating element 130 may be coupled to igniter housing 128 at any desired location along igniter housing 128, such as between combustor casing 108 and outer combustor liner 102. In further alternative embodiments, heat-dissipating element 130 may be coupled to igniter housing 128 by any suitable coupling method, such as welding or brazing. In yet further alternative embodiments, heat-dissipating element 130 may be integrally formed within igniter housing 128, such as by machining. As described in more detail below, coupling heat-dissipating element 130 at a desired location on fuel igniter assembly 126 facilitates dissipation of heat away from fuel igniter assembly 126, and keeps elements within fuel igniter assembly 126 within suitable operating temperatures.

Second end 158 of fuel igniter assembly 126 is coupled to a flexible conduit 160 via clamp 162. Conduit 160 houses an ignition lead 164 (shown in FIG. 5) configured to supply a voltage used to create a spark and ignite the air-fuel mixture within combustion chamber 110. In the exemplary embodiment, ignition lead 164 is configured to supply a voltage of at least about 10,000 volts, more specifically 15,000 volts, and even more specifically, at least about 20,000 volts. In alternative embodiments, ignition lead 164 may be configured to supply any suitable voltage that enables fuel igniter assembly 126 to function as described herein.

In the exemplary embodiment, conduit 160 is an air-cooled ignition lead including an air inlet 166 coupled in flow communication with an air supply (not shown). Air is supplied through air inlet 166 and flows through conduit 160 and around ignition lead 164 (shown in FIG. 5). Conduit 160 is coupled to a cylindrical shroud 168 (generally, a shell) adjacent second end 158 of fuel igniter assembly 126. Shroud 168 defines an airflow channel 170 between igniter housing 128 and shroud 168. Air supplied through air inlet 166 flows through channel 170 and impinges upon fins 152 of heat-dissipating element 130. In the exemplary embodiment, fins 152 of heat-dissipating element 130 are oriented substantially parallel to longitudinal axis 146 of fuel igniter assembly 126. Thus, air supplied through air inlet 166 is directed across heat-dissipating element 130 in a direction substantially parallel to fins 152.

Figure 5:
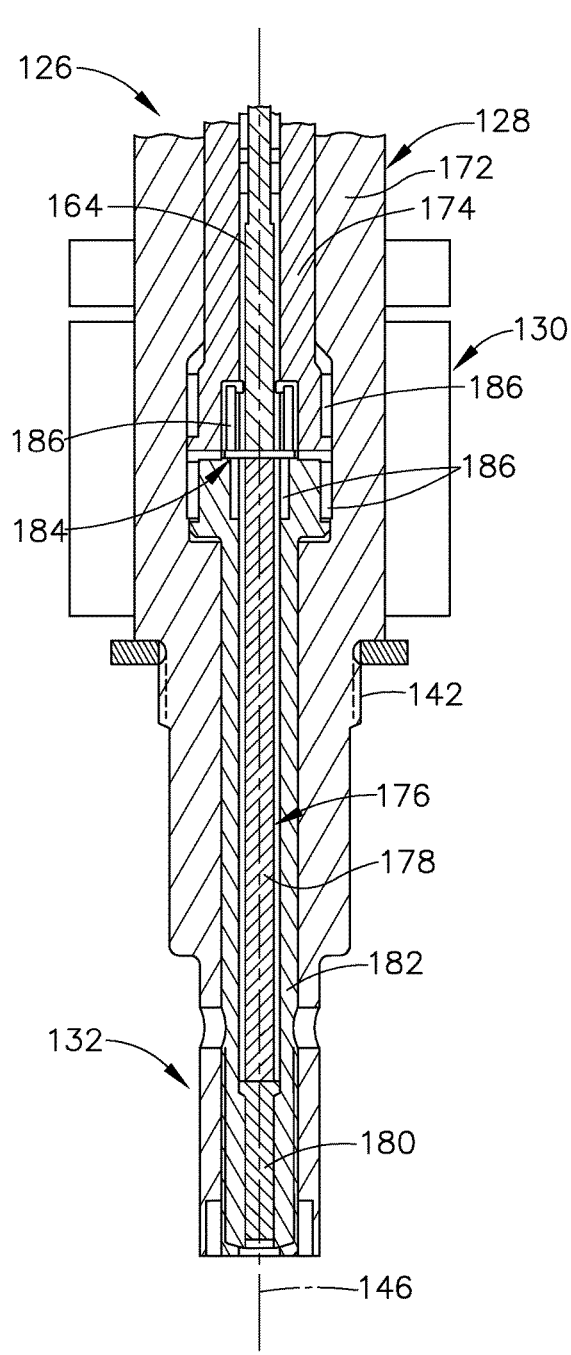
FIG. 5 is a partial cross-sectional view of the fuel igniter assembly shown in FIG. 2.

FIG. 5 is a partial cross-sectional view of fuel igniter assembly 126 shown in FIG. 2. As shown in FIG. 5, igniter housing 128 includes an elongate body 172 having a cavity 174 defined therein. A fuel igniter 176, including an electrode 178 and an electrode tip 180, is positioned within cavity 174 and extends along longitudinal axis 146 of fuel igniter assembly 126. Electrode tip 180 is positioned within tip portion 132 of fuel igniter assembly 126, and is configured to provide an electrical spark to ignite the air-fuel mixture within combustion chamber 110. In the exemplary embodiment, igniter housing 128 also includes an inner housing 182 interposed between body 172 of igniter housing 128 and fuel igniter 176.

Fuel igniter 176 is electrically coupled to ignition lead 164 at a connection point 184 within the igniter housing 128. In the exemplary embodiment, one or more dielectric members 186 are positioned proximate connection point 184 to prevent arcing between fuel igniter 176, ignition lead 164, igniter housing 128, and/or shroud 168 (shown in FIG. 2). In the exemplary embodiment, dielectric members 186 are annular dielectric members fabricated from a rubber or plastic polymeric material. Each dielectric members 186 surrounds at least one of electrode 178 of fuel igniter 176 and ignition lead 164.

Heat-dissipating element 130 is coupled to igniter housing 128 proximate connection point 184. More specifically, heat-dissipating element 130 is coupled to igniter housing 128 such that heat-dissipating element 130 surrounds connection point 184. In the exemplary embodiment, heat-dissipating element 130 completely surrounds connection point 184, although in alternative embodiments, heat-dissipating element 130 may only partially surround connection point 184. Heat-dissipating element 130 provides heat-dissipation from igniter housing 128 proximate connection point 184 between ignition lead 164 and fuel igniter 176. Heat-dissipating element 130 thus helps maintain the operating temperature of fuel igniter assembly 126 and components therein (such as dielectric members 186), and prevents overheating of fuel igniter assembly 126 and components therein.

In the exemplary embodiment, heat-dissipating element 130 is fabricated from a nickel-based superalloy that has a high strength at the elevated temperatures experienced during operation of turbine engine 10. Suitable nickel-based superalloys include alloys from the Inconel® family of alloys, such as Inconel® Alloy 625. In alternative embodiments, heat-dissipating element 130 may be fabricated from other materials suitable for use at the elevated temperatures experienced during operation of turbine engine 10, such as stainless steel 410. In yet further alternative embodiments, heat-dissipating element 130 may be fabricated from materials having a higher thermal conductivity than nickel-based super alloys and stainless steel, such as copper-based or aluminum-based alloys (e.g., Aluminum Alloy 6061). Also, in the exemplary embodiment, heat-dissipating element 130 is fabricated from the same material from which igniter housing 128 is assembled, although in alternative embodiments, heat-dissipating element 130 and igniter housing 128 may be fabricated from different materials.

Figure 6:
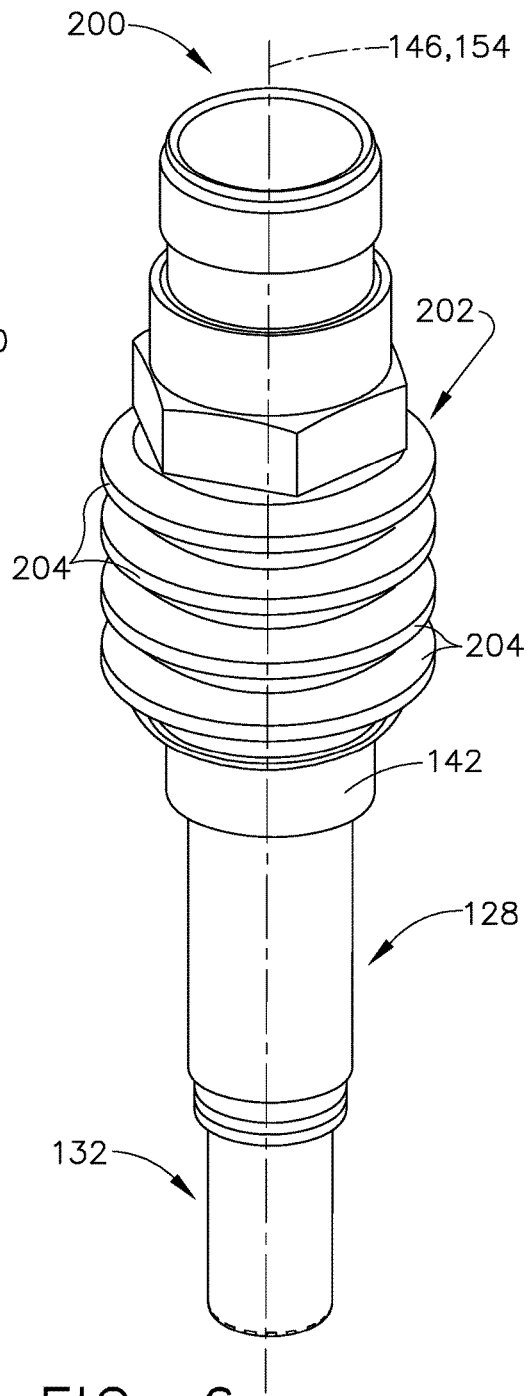
FIG. 6 is a perspective view of an alternative fuel igniter assembly suitable for use with the gas turbine engine shown in FIG. 1.

FIG. 6 is a perspective view of an alternative fuel igniter assembly 200 suitable for use with gas turbine engine 10 shown in FIG. 1. Fuel igniter assembly 200 has substantially the same configuration as fuel igniter assembly 126, with the exception that shroud 168 (shown in FIG. 2) is omitted from fuel igniter assembly 200, and the heat-dissipating element 202 includes fins 204 oriented substantially transverse to longitudinal axis 146 of fuel igniter assembly 200. Accordingly, like elements are labeled with like reference numerals. In this embodiment, heat-dissipating properties of heat-dissipating element 202 may be enhanced by directing an airflow across heat-dissipating element 202 in a direction substantially parallel to fins 204. For example, an airflow 124 (shown in FIG. 2) may be channeled from fan assembly 12 and/or compressor 16 (shown in FIG. 1) and directed along exterior 118 of combustor casing 108 (shown in FIG. 2) such that air flows in a direction substantially parallel to fins 204 of heat-dissipating element 200. In alternative embodiments, airflow 124 may be directed along exterior 118 of combustor casing 108 such that air flows in a direction other than substantially parallel to fins 204 of heat-dissipating element 200.

The fuel igniter assemblies and methods described herein facilitate enhanced heat dissipation of fuel igniter assemblies, and thus allow for reduced operating temperatures of fuel igniter assemblies and components therein. Specifically, the fuel igniter assemblies described herein utilize heat-dissipating elements having fins, thereby increasing the effective surface area capable of dissipating heat away from the fuel igniter assemblies. Additionally, the heat-dissipating elements are positioned proximate an electrical connection point between an ignition lead and a fuel igniter to provide maximum heat dissipation around fuel igniter assembly components most susceptible to overheating. Additionally, the fuel igniter assemblies and methods described herein utilize air flow provided by an air-cooled ignition lead and/or air flow channeled from the compressor of a gas turbine engine to enhance the heat-dissipating properties of the heat-dissipating elements.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose embodiments of the present disclosure, including the best mode, and also to enable any person skilled in the art to practice the systems and methods described herein, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A combustor for a gas turbine engine, said combustor comprising:
    a combustion chamber defined by an annular inner combustor liner and an annular outer combustor liner;
    a fuel igniter assembly coupled to said combustor and extending radially outward from the outer combustor liner, said fuel igniter assembly comprising an igniter housing configured to house a fuel igniter therein;
    a heat-dissipating element configured to be coupled to said igniter housing, said heat-dissipating element comprising a plurality of fins configured to dissipate heat from said fuel igniter assembly, wherein the plurality of fins are perpendicular to a hex nut disposed on the igniter housing; and
    a shroud that defines an airflow channel between igniter housing and the shroud, wherein the heat-dissipating element is included within the shroud.

2. A combustor in accordance with claim 1, further comprising an ignition lead electrically coupled to said fuel igniter at a connection point within said igniter housing.

3. A combustor in accordance with claim 2, wherein said heat-dissipating element is coupled to said igniter housing such that said heat-dissipating element at least partially surrounds the connection point between said ignition lead and said fuel igniter.

4. A combustor in accordance with claim 2, wherein said ignition lead comprises an air cooled ignition lead.

5. A combustor in accordance with claim 2, wherein said ignition lead is configured to supply an electrical voltage of at least about 15,000 volts to said fuel igniter.

6. A combustor in accordance with claim 2, further comprising a dielectric member disposed between said igniter housing and said fuel igniter.

7. A combustor in accordance with claim 1, wherein said heat-dissipating element is disposed along a portion of said igniter housing disposed radially outward from said outer combustor liner.

8. A fuel igniter assembly for use in a combustor, said fuel igniter assembly comprising:
    an igniter housing comprising an elongate body having a cavity defined therein;
    a fastener disposed on the igniter housing;
    a fuel igniter positioned within said cavity;
    an ignition lead electrically coupled to said fuel igniter at a connection point within said igniter housing;
    a heat-dissipating element coupled to said igniter housing such that said heat-dissipating element at least partially surrounds the connection point between said ignition lead and said fuel igniter, wherein the heat-dissipating element includes a plurality of fins configured to dissipate heat from said fuel igniter assembly, and said fins are located between the fastener and the combustor; and
    a shroud that defines an airflow channel between igniter housing and the shroud, wherein the heat-dissipating element is disposed within the shroud.

9. A fuel igniter assembly in accordance with claim 8, wherein said heat-dissipating element comprises a body and the plurality of fins extend radially outward from said body.

10. A fuel igniter assembly in accordance with claim 8, wherein said fins are oriented substantially parallel to an axial length of said fuel igniter assembly.

11. A fuel igniter assembly in accordance with claim 8, wherein said fins are oriented substantially transverse to an axial length of said fuel igniter assembly.

12. A fuel igniter assembly in accordance with claim 8, wherein said fins are oriented substantially parallel to one another.

13. A fuel igniter assembly in accordance with claim 8, wherein said heat-dissipating element comprises between 20 and 40 fins.

14. A fuel igniter assembly in accordance with claim 8, wherein said heat-dissipating element is coupled to said igniter housing by a press-fit connection.

15. A fuel igniter assembly in accordance with claim 8, wherein said heat-dissipating element is constructed from at least one of stainless steel and a nickel-based superalloy.

16. A method of operating a gas turbine engine including a combustor and a compressor, the combustor including a fuel igniter assembly including an igniter housing, a fuel igniter positioned within the igniter housing, and a set of fins coupled to the igniter housing between the combustor, a shroud that at least partially encloses the set of fins and defines an airflow channel between the igniter housing and the shroud, and a nut disposed on the igniter housing, the method comprising:
    supplying an electrical voltage to the fuel igniter;
    directing an airflow through the shroud and across at least a subset of the fins to dissipate heat from the fuel igniter assembly; and
    coupling the fuel igniter to an air-cooled ignition lead wherein air is supplied through an air inlet and flows through a conduit and around the ignition lead, wherein directing the airflow across the subset of fins comprises directing air through the air inlet and along a longitudinal direction of the fins.

17. A method in accordance with claim 16, wherein directing the airflow across the fins comprises channeling the airflow from the compressor to the fins such that air flows in a direction substantially parallel to the fins.

18. A method in accordance with claim 16 wherein supplying an electrical voltage to the fuel igniter comprises supplying an electrical voltage of at than about 15,000 volts.

* * * * *